United States Patent
Croxford

(10) Patent No.: US 10,262,632 B2
(45) Date of Patent: Apr. 16, 2019

(54) PROVIDING OUTPUT SURFACES FOR DISPLAY IN DATA PROCESSING SYSTEMS

(71) Applicant: ARM Limited, Cambridge (GB)

(72) Inventor: Daren Croxford, Cambridge (GB)

(73) Assignee: Arm Limited, Cambridge (GB)

( * ) Notice: Subject to any disclaimer, the term of this patent is extended or adjusted under 35 U.S.C. 154(b) by 186 days.

(21) Appl. No.: 15/002,596

(22) Filed: Jan. 21, 2016

(65) Prior Publication Data

US 2016/0217771 A1 Jul. 28, 2016

(30) Foreign Application Priority Data

Jan. 26, 2015 (GB) .................................. 1501247.9

(51) Int. Cl.
*G09G 5/395* (2006.01)
*G09G 5/397* (2006.01)

(52) U.S. Cl.
CPC ............ *G09G 5/395* (2013.01); *G09G 5/397* (2013.01); *G09G 2330/021* (2013.01); *G09G 2340/02* (2013.01); *G09G 2350/00* (2013.01); *G09G 2360/12* (2013.01); *G09G 2360/122* (2013.01); *G09G 2360/127* (2013.01); *G09G 2370/20* (2013.01)

(58) Field of Classification Search
CPC .... G09G 5/395; G09G 5/397; G09G 2370/20; G09G 2330/021; G09G 2350/00; G09G 2360/122; G09G 2360/127; G09G 2340/02; G09G 2360/12

See application file for complete search history.

(56) References Cited

U.S. PATENT DOCUMENTS

| | | | | |
|---|---|---|---|---|
| 5,828,780 A | * | 10/1998 | Suzuki ................. | H04N 1/6027 358/518 |
| 6,366,289 B1 | * | 4/2002 | Johns .................... | G06F 12/023 345/543 |
| 6,587,583 B1 | * | 7/2003 | Kurzweil ................. | G06T 9/00 358/462 |
| 2014/0101357 A1 | | 4/2014 | Stolitzka | |
| 2014/0168361 A1 | * | 6/2014 | Noraz ....................... | G06T 9/00 348/43 |

(Continued)

FOREIGN PATENT DOCUMENTS

CN 104113759 10/2014

OTHER PUBLICATIONS

GB Search Report dated Jul. 16, 2015, GB Patent Application No. GB1501247.9.

(Continued)

*Primary Examiner* — Tapas Mazumder
(74) *Attorney, Agent, or Firm* — Vierra Magen Marcus LLP

(57) ABSTRACT

A data processing system 1 comprises a display controller operable to provide to a display a compressed version of an output surface to be displayed that has been compressed using a lossy compression scheme, and one or more processing stages operable to provide a surface or surfaces that are to be used when forming an output surface to be displayed. At least one of the one or more processing stages is operable to output one or more regions of the surface or surfaces that it provides to be used when forming an output surface to be displayed in a compressed form using a lossy compression scheme.

23 Claims, 5 Drawing Sheets

(56) References Cited

U.S. PATENT DOCUMENTS

2014/0362098 A1    12/2014  Kerofsky
2015/0379383 A1*   12/2015  Varga .................. H04N 19/119
                                                         358/3.27

OTHER PUBLICATIONS

Walls, et al., "VESA Display Stream Compression," Broadcom Corporation, Mar. 3, 2014, 5 pages.
"First VESA Display Stream Compression (DSC) Decoder IP Announced by Hardent," Apr. 17, 2014, available at: http://eecatalog.com/multicore/2014/04/17/first-vesa-display-stream-compression-dsc-decoder-ip-announced-by-hardent/.
Chinese Office Action dated Dec. 27, 2018, Chinese Application No. 201610032703.1.

* cited by examiner

PROVIDING OUTPUT SURFACES FOR DISPLAY IN DATA PROCESSING SYSTEMS

BACKGROUND

The technology described herein relates to data processing systems, and in particular to the processing of data when generating a surface for display on a display in a data processing system.

In data processing systems, an image that is to be displayed will typically be processed by a number of processing stages before it is finally displayed on a display.

For example, one or more frame generators such as a graphics processing unit (GPU), video engine, etc., will generate frames (surfaces) that are to contribute to the final, displayed, surface.

In addition, a composition engine may combine plural individual input surfaces into a composited output surface.

The final surface (e.g. the composited frame) to be displayed is usually stored in a frame buffer in memory, from where it is read by the display controller for the display (e.g. by internal Direct Memory Access (DMA)). The display controller then sends the frame to the display for display (e.g. via a pixel pipeline) (the display may, e.g., be a screen or printer).

The bandwidth cost of sending pixel data from the display controller to the display can be significant. One way to reduce the bandwidth required and power required for a data processing system is to compress the pixel data that is transmitted from the display controller to the display. For example, display controllers may use Display Stream Compression (DSC) (which is designed to be a mathematically lossy, but "visually lossless" (i.e. unnoticeable to the user) compression scheme) to compress pixel data sent from a display controller to a display.

Although such compression techniques are successful in reducing the power and bandwidth requirements of the system, the Applicants believe that there remains scope for improvements to such data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
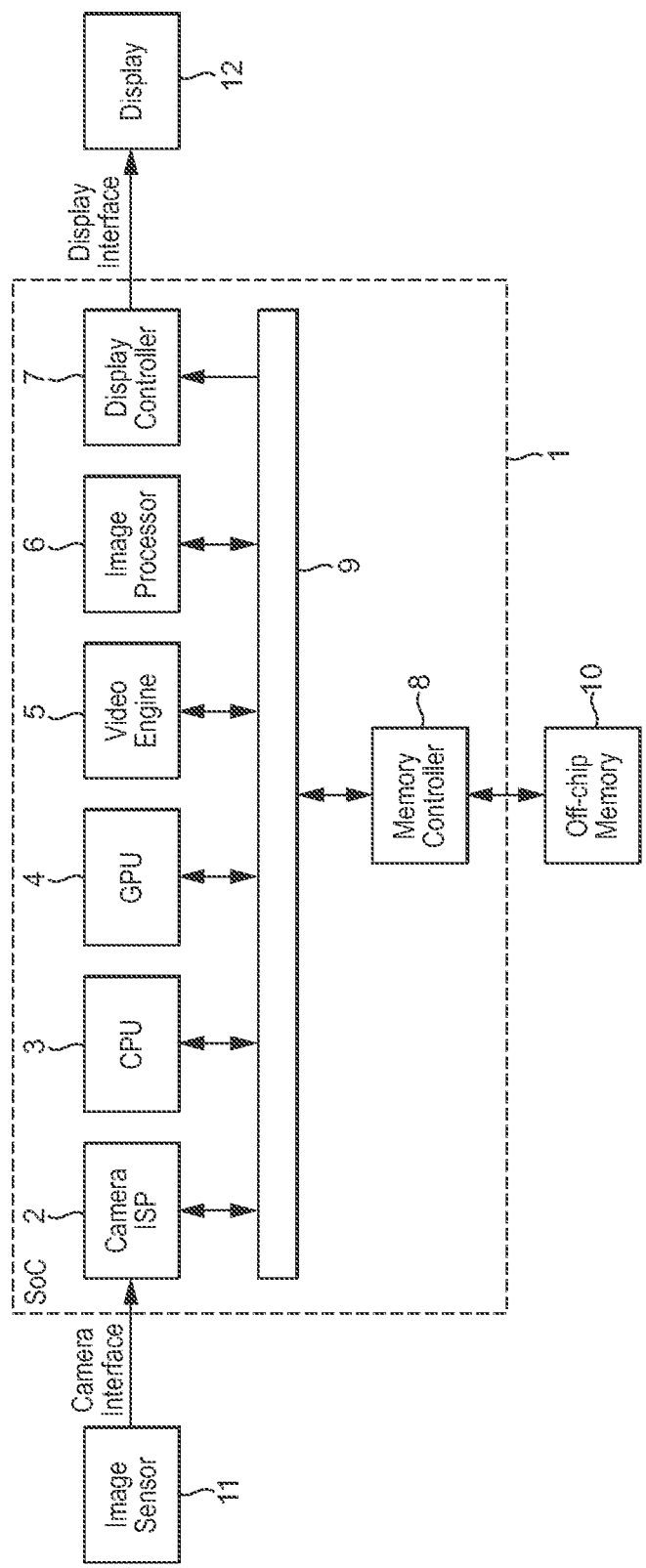
FIG. 1 shows schematically a data processing system in accordance with an embodiment of the technology described herein.

A first embodiment of the technology described herein comprises a data processing system comprising:

a display controller operable to provide to a display a compressed version of an output surface to be displayed that has been compressed using a lossy compression scheme; and one or more processing stages operable to provide a surface or surfaces that are to be used when forming an output surface to be displayed; wherein:

at least one of the one or more processing stages is operable to output one or more regions of the surface or surfaces that it provides to be used when forming an output surface to be displayed in a compressed form using a lossy compression scheme.

A second embodiment of the technology described herein comprises a method of operating a data processing system that comprises: a display controller operable to read a surface or surfaces from memory and to provide to a display a compressed version of an output surface to be displayed that has been compressed using a lossy compression scheme; and one or more processing stages operable to provide a surface or surfaces that are to be used when forming an output surface to be displayed; the method comprising:

one or more of the one or more processing stages providing a surface or surfaces to be used when forming an output surface to be displayed; and the display controller reading at least one of the surfaces provided by a processing stage from memory, using the surface to form an output surface to be displayed, and providing the output surface to a display for display in a compressed form that uses a lossy compression scheme;

wherein:

at least one of the one or more processing stages outputs one or more regions of the surface or surfaces that it provides to be used when forming the output surface to be displayed in a compressed form using a lossy compression scheme.

The technology described herein relates to a data processing system in which a display controller is operable to provide an output surface that has been compressed using a lossy compression scheme to a display. The data processing system also includes one or more processing stages upstream of the display controller that provide surfaces that are used when forming the displayed surface, but in contrast with known arrangements, at least one of the upstream processing stages is operable to output the surface that it provides in a compressed form, using a lossy compression scheme.

Thus, in the technology described herein, at least one surface used to generate the output surface to be displayed is compressed using a lossy compression scheme upstream of the display controller. This then means that the overall memory bandwidth and power requirements of the system can be reduced.

Moreover, the Applicants have recognised that this can be done without adversely affecting the quality of the image that is displayed. This is because the lossy compression that is used to compress the output surface that is provided from the display controller to the display effectively discards some of the image quality, and so in many cases it will not matter if some of this image quality is instead effectively discarded at an earlier (upstream) stage in the processing.

Accordingly, the technology described herein lies at least in part in the realisation that in arrangements where the output surface that is provided from the display controller to the display is compressed using a lossy compression scheme (such as DSC), it is possible to lossily compress the data used to generate the output surface for display at an earlier (upstream) stage in the processing, thereby saving power and bandwidth, without adversely affecting the quality of the image that is displayed.

In the data processing system of the technology described herein, one or more processing stages provide surfaces that are used to form an output surface to be displayed, and then a display controller provides the output surface (in a lossily compressed form) to a display for display.

The surface or surfaces provided by the processing stages may be any suitable and desired such surface(s) (e.g. frames). In an embodiment they are windows to be displayed, and in an embodiment images, e.g. frames, for display. The surfaces may be, e.g., for a game, a demo, a graphical user interface (GUI), a GUI with video data (e.g. a video frame with graphics "play back" and "pause" icons), etc.

The output surface to be displayed can correspondingly comprise any suitable and desired such surface (e.g. frame) for display. Again, it is in an embodiment a window, and in an embodiment an image, e.g. frame, that is to be displayed.

The one or more processing stages that are operable to provide a surface or surfaces that are used to form the output surface to be displayed may comprise any suitable processing stage(s) that are operable to provide surfaces for display in a data processing system. They will be, and in an embodiment are, "upstream" of the display controller in the overall processing flow that generates and provides the output surface that is displayed. There may only be a single processing stage upstream of the display controller, but in an embodiment there are plural processing stages.

The processing stages may include at least one processing stage that is operable to generate a surface for display. Thus, in one embodiment, at least one of the one or more processing stages comprises a frame generator operable to generate one or more surfaces. The "frame generator" processing stage(s) may comprise, for example, a graphics processing unit (GPU), a video codec or video engine, a digital camera image signal processor (ISP), an image processor, and/or a central processing unit (CPU), etc. There may be more than one frame generator, if desired.

The frame generator should generate its surface in an appropriate manner, e.g. by rendering the surface in the case of a graphics processor, by appropriately decoding input encoded video data in the case of a video codec or video engine, from a captured image in the case of a digital camera image signal processor (ISP), etc.

The one or more processing stages may also or instead (and in an embodiment also) include a stage or stages that are operable to process a previously generated surface or surfaces, e.g. in order to produce an, e.g., modified version of that surface or surfaces.

This would be the case, for example, where a composition engine composes plural surfaces to provide a composited surface.

Thus, in an embodiment, at least one of the one or more processing stages comprises a composition stage operable to compose (two or more) surfaces to generate a composited surface. In this case, the surfaces that are composed by the composition stage in an embodiment comprise (two or more of) the surfaces generated by the at least one frame generator. Accordingly, the composition stage is in an embodiment operable to read (two or more) surfaces from memory.

The composition stage may be configured to compose the surfaces to generate a composited surface in any suitable manner and as desired. In an embodiment, the composition stage is configured to blend or otherwise combine the surfaces to generate a composited surface. The composition stage is in an embodiment operable to store the composited output surface in memory. In an embodiment, the composited surface is to be used as the output surface that is displayed.

The one or more processing stages may also or instead (and in an embodiment also) comprise a compression stage that is operable to compress an input surface to provide a compressed representation or version of the input surface. Thus, in an embodiment, at least one of the one or more processing stages comprises a compression stage operable to compress (one or more regions of) a surface. The compression stage(s) may be operable to compress any one or more or all regions of one or more or all of the surfaces produced by other processing stages of the system.

Again, the compression stage is in an embodiment operable to store the compressed surface or surfaces in memory.

One or more of the processing stages may also or instead (and in an embodiment also) be operable to (selectively) modify one or more regions or surfaces. For example, one or more of the processing stages may be operable to (selectively) perform image enhancement modifications to one or more regions or surfaces, such as altering the contrast and/or brightness, performing gamma correction, and/or performing tone mapping; to (selectively) rotate and/or scale one or more regions or surfaces; and/or to (selectively) perform image enhancement schemes, e.g. to improve display responsiveness, such as Level Adaptive Overdrive (LAO), Feed Forward Drive (FFD), Dynamic Contrast Compensation (DCC), etc. One or more of the processing stages may, of course, be operable to perform other types of processing and/or modifications.

In an embodiment, there is a sequence of processing stages (in the order of the processing flow that generates the output surface that is to be displayed), for example, and in an embodiment, comprising one or more frame generating processing stages that generate frames that are to be used to form the output surface that is displayed, followed by, for example, one or more processing stages, such as a composition stage, that take the surfaces produced by the frame generators and process one or more of those surfaces (e.g. compose them to form a composited surface) to form a further surface or surfaces, e.g. that is or are to form and/or contribute to the output surface that is displayed. The display controller may then take any one or more or all of the surfaces produced by the processing stages as or to form the output surface that it sends to the display.

Accordingly, a surface provided by a processing stage to be used when forming an output surface to be displayed may be used directly as or as part of the output surface to be displayed, and/or a surface or surfaces provided by a processing stage to be used when forming an output surface to be displayed may not be used directly as or in the output surface to be displayed but may instead first be processed (e.g. modified) by another processing stage, with the output of that processing stage then being used as or as part of the output surface to be displayed (or subjected to further processing, and so on). In the latter case, the surface provided by the processing stage that is to be used when forming the output surface will, in effect, be an intermediate surface in the overall processing flow that generates the surface or surfaces that are used to form and/or contribute to the final output surface that is displayed.

As discussed above, the processing stages are in an embodiment operable to store their respective output surfaces in memory (and correspondingly to read surfaces that they are to process from memory (where appropriate)). This memory may comprise any suitable memory and may be configured in any suitable and desired manner. For example, it may be a memory that is on chip with and/or local to the processing stage in question or it may be an external memory. In an embodiment it is an external memory, such as a main memory of the data processing system. It may be dedicated memory for this purpose or it may be part of a memory that is used for other data as well. In an embodiment the one or more surfaces are stored in (and read from) a or respective, frame buffers. For example, respective processing stage frame buffers may be provided in the main memory of the data processing system.

The display controller may comprise any suitable display controller operable to provide to a display an output surface that has been compressed using a lossy compression scheme.

Thus, the display controller will be, and is in an embodiment, operable to read one or more regions of a surface or surfaces to be displayed, in an embodiment from memory in which the surface or surfaces are stored, and to provide a lossily compressed output surface formed from those input surface or surfaces to a display for display.

The display controller could be operable simply to read a single input surface that it then provides all or part of as a lossily compressed output surface to the display, or, alternatively, the display controller could be operable to read in and combine (if desired) plural input surfaces to thereby provide the lossily compressed output surface to the display. As discussed above, the (input) surfaces that the display controller reads and uses to provide the output surface to the display will be provided by one or more of the (upstream) processing stages of the data processing system. Thus the input surfaces to the display controller may comprise one or more regions of one or more surfaces generated by a frame generator or generators, and/or one or more regions of a composited output surface composed by a composition stage or stages, and/or one or more regions of a surface output by a compression stage or stages, etc.

Accordingly the display controller in an embodiment comprises an input stage operable to read one or more regions of an input surface or surfaces. In an embodiment, the input stage comprises a read controller, such as for example a Direct Memory Access (DMA) read controller.

The display controller is operable to provide a lossily compressed output surface to a display. Thus, the display controller in an embodiment comprises an output stage operable to provide a lossily compressed output surface to the display. This output stage may be any suitable such output stage operable to provide an output surface for display to the display, e.g. to cause the output surface for display to be displayed on the display (to act as a display interface). The output stage in an embodiment comprises appropriate timing control functionality (e.g. it is configured to send pixel data to the display with appropriate horizontal and vertical blanking periods) for the display.

To enable it to provide a lossily compressed output surface to a display, the display controller is in an embodiment capable of and operable to compress one or more regions of one or more surfaces using a lossy compression scheme. The display controller in an embodiment comprises a compression stage operable to compress one or more regions of one or more surfaces for this purpose.

The lossy compression scheme that the display controller can use to compress an input surface or surfaces to provide the compressed output surface may comprise any suitable and desired lossy compression scheme.

The display controller in an embodiment uses a substantially visually lossless compression scheme, and in an embodiment Delta Pulse Code Modulation (DPCM) and/or Indexed Colour History (ICH). The display controller lossy compression scheme in an embodiment operates on raster lines of the surface to be compressed, i.e. each raster line (row) of pixels (sampling positions) is compressed together. In an embodiment, the display controller uses and supports Display Stream Compression (DSC).

The display controller should, and in an embodiment does, operate to compress any uncompressed input surfaces or input surface regions that are to be provided as a lossily compressed output surface to the display using the appropriate lossy compression scheme (before providing the surface or surface region to the display).

As discussed above, as well as potentially receiving uncompressed (input) surfaces (and/or (input) surface regions) for provision to the display, one or more of the surfaces (and/or regions of the surfaces) that are to form or contribute to an output surface may be provided in a compressed form (whether in a lossily compressed form or otherwise). In other words, the display controller input surface or surfaces may be compressed or may be uncompressed, and/or may comprise one or more regions that are compressed and/or one or more regions that are uncompressed.

Where an (input) surface or surface region is already compressed, the display controller may or may not need to convert those compressed surfaces (or surface regions) into the lossily compressed form that is to be sent to the display.

For example, when (if) the input surface is already in the lossily compressed form that is required for the display, then the display controller could, and in an embodiment does, simply pass the already compressed input surface (or input surface region or regions) to the display without further compression.

On the other hand, when (if) the compression scheme used for the input surface or surfaces does not match the lossy compression scheme that is used for the output surface that is provided to the display, then the display controller may need to, and in an embodiment does, convert the compressed input surface into an appropriately lossily compressed format for provision to the display. This may, and in an embodiment does, involve decompressing the compressed input surface or surfaces (region or regions), and then recompressing the decompressed surface or surfaces (region or regions) using the display controller lossy compression scheme.

Thus, in an embodiment, the display controller is capable of and operable to decompress compressed regions of a surface that are compressed using a compression scheme other than the display controller lossy compression scheme (e.g. other than DSC), e.g. to generate one or more decoded and/or decompressed regions of the surface. The display controller in an embodiment comprises a decompression stage operable to decode and/or decompress one or more regions of a surface for this purpose. The display controller decompression stage may comprise, for example, a DSC decoder for decompressing one or more DSC compressed regions of a surface and/or an ARM Frame Buffer Compression (AFBC) decoder for decompressing one or more AFBC compressed regions of a input surface (AFBC is described in US-A1-2013/0034309).

The display controller (compression stage) is then in an embodiment operable to compress the decompressed region(s) (using the display controller lossy compression scheme), e.g. so as to generate one or more regions of the output surface.

Thus the display controller (its compression stage) is in an embodiment operable to (selectively) compress uncompressed regions of an (input) surface and/or regions of an (input) surface that have been decompressed (e.g. by a display controller decompression stage).

Thus, in an embodiment, the lossily compressed output surface that is provided to the display can comprise one or more regions that have been compressed by the display controller (e.g. its compression stage), and/or one or more regions that have been compressed by other than (not by) the display controller (such as for example, by one or more of the one or more upstream processing stages).

Thus, in an embodiment, the output surface that is provided to the display (and that has been compressed using the "display controller" lossy compression scheme) comprises one or more regions of a surface compressed by other than (not by) the display controller (and in an embodiment compressed by one or more of the one or more processing stages).

In an embodiment, the display controller is operable to perform some form of processing on the input surface or surfaces that are used to form the output surface that is displayed, for example to (selectively) modify one or more regions of the input surface or surfaces. The display controller may comprise one or more processing stages operable to process an input surface to generate an output surface to be displayed for this or these purpose(s).

The display controller may be operable, for example, to (selectively) perform image enhancement modifications to one or more regions of the input surface or surfaces, such as altering the contrast and/or brightness, performing gamma correction, and/or performing tone mapping. Additionally or alternatively, the display controller may be operable to (selectively) rotate and/or scale the region or surface. Additionally or alternatively, the display controller may be operable to (selectively) perform image enhancement schemes, e.g. to improve display responsiveness, such as Level Adaptive Overdrive (LAO), Feed Forward Drive (FFD), Dynamic Contrast Compensation (DCC), etc. The display controller may, of course, be operable to perform other types of processing and/or modifications.

In these embodiments, the display controller may, and in an embodiment does, selectively decode and/or decompress one or more regions of an encoded and/or compressed input surface (i.e. where necessary) so that they can then be processed (e.g. modified by the display controller). The display controller (e.g. its compression stage) is in an embodiment then operable to compress (lossily) the modified region(s), e.g. so as to generate one or more regions of the lossily compressed output surface that is displayed.

In an embodiment, where an already compressed (input) surface region is modified by the display controller, it is determined whether the modified version is the same as or is sufficiently similar to the unmodified version of the input surface region, and if so, the unmodified compressed version of the region is output by the display controller (i.e. instead of the modified, compressed version). In this embodiment, where the unmodified version of the region is output by the display controller, the modified version of the region need not then be (and in an embodiment is not) compressed by the display controller, thereby reducing the amount of processing required by the display controller.

A modified region may be determined to be sufficiently similar to its corresponding unmodified region e.g. when (if) the differences between the two versions of the region are sufficiently small, e.g. fall below a threshold (which is in an embodiment set such that the differences are or would be imperceptible when displayed).

Thus, in these embodiments, where a region is modified, either the modified version of the region or the unmodified version of the region is output by the display controller (i.e. is provided to the display), depending on whether the modification causes sufficient changes to the region. Where the unmodified version of the region is output by the display controller, the modified version of the region is in an embodiment discarded and need not be (and in an embodiment is not) compressed by the display controller, thereby reducing the amount of processing required by the display controller.

In an embodiment, the display controller is configured such that those region(s) of an (input) surface that are already compressed using the "display controller" lossy compression scheme and for which no modifications are required can bypass the display controller decompression stage, modification stage and compression stage (if any). Such region(s) of the (input) surface are in an embodiment then used as or as part of the output surface.

Thus, in an embodiment, the display controller includes one or more of, and in an embodiment all of: a compression stage, one or more modification stages and a decompression stage, and each of these stages (if present) can in an embodiment be selectively bypassed, e.g. when appropriate or desired. This then means that the amount of processing performed by the display controller can be reduced.

Accordingly, in an embodiment, the display controller is configured to: read one or more regions of an input surface; and determine whether one or more of the one or more read regions is compressed.

In an embodiment, when (if) it is determined that a read region is other than compressed (i.e. is not compressed), then the display controller in an embodiment compresses the read region (and the read region may be modified prior to being compressed, if desired), using the display controller lossy compression scheme, e.g. DSC, so as to generate an appropriately lossily compressed output surface region for provision to the display.

On the other hand in an embodiment, when (if) it is determined that a read region is region is compressed, then the display controller in an embodiment determines whether the read region is compressed using the display controller lossy compression scheme (e.g. DSC). When (if) it is determined that a read region is compressed using a compression scheme other than the display controller lossy compression scheme, then the display controller in an embodiment decompresses the read region and compresses the decompressed region using the display controller lossy compression scheme (e.g. DSC).

The so-compressed region is then in an embodiment used for the (corresponding) region of the output surface that is provided to the display.

Again, the decompressed region may be modified prior to being compressed, if desired.

Correspondingly in an embodiment, when (if) it is determined that a read region is compressed using the display controller lossy compression scheme (e.g. DSC), then the display controller in an embodiment determines whether the read region that is compressed using the display controller lossy compression scheme requires modification.

In an embodiment, when (if) it is determined that the read region that is compressed using the display controller lossy compression scheme other than requires modification (i.e. does not require modification), then the display controller in an embodiment provides the read region that is compressed using the display controller lossy compression scheme to the display, as or as part of the output surface.

On the other hand, when (if) it is determined that the read region that is compressed using the display controller lossy compression scheme requires modification, then the display controller in an embodiment decompresses the read region that is compressed using the display controller lossy compression scheme, modifies the decompressed region, and determines whether the modified region is the same as or sufficiently similar to the read region that was compressed using the display controller lossy compression scheme.

When (if) it is determined that the modified region is the same as or sufficiently similar to the read region that is compressed using the display controller lossy compression scheme, then the display controller in an embodiment provides the read region that is compressed using the display controller lossy compression scheme to the display, in an embodiment as or as part of the output surface, and the modified region is in an embodiment discarded.

On the other hand, when (if) it is determined that the modified region is other than the same as or sufficiently similar to (i.e. is not the same as nor sufficiently similar to (is sufficiently dissimilar to)) the read region that is compressed using the display controller lossy compression scheme, then the display controller in an embodiment compresses the modified region using the display controller lossy compression scheme, and the so-compressed region is then in an embodiment used for the corresponding region of the output surface. That is, the so-compressed region is in an embodiment provided to the display, in an embodiment as or as part of the output surface.

In an embodiment, the display controller is operable to write an output surface to external memory. The display controller may comprise a write-out stage operable to write the output surface to external memory for this purpose. The write-out stage may be any suitable such stage that can write an output surface to external memory. In one embodiment, the write-out stage comprises a write controller, such as a Direct Memory Access (DMA) write controller.

In an embodiment, the output surface that may be written to external memory is (an optionally modified version of) the output surface that is provided to the display.

The external memory to which the write-out stage can write data should be and is in an embodiment one or more memories external to the display controller. The external memory is in an embodiment provided as or on a separate chip (monolithic integrated circuit) to the display controller. The external memory in an embodiment comprises a or the main memory (e.g. that is shared with the central processing unit (CPU)), e.g. a frame buffer, of the overall data processing system.

At least one of the one or more (upstream) processing stages of the data processing system is able to output one or more regions of the surface that it produces in a lossily compressed form (using a lossy compression scheme). Any one or more of the one or more upstream processing stages may be configured to do this.

Accordingly, in an embodiment, the system comprises one or more or all of: one or more frame generator processing stages that is or are operable to output one or more regions of one or more surfaces that have been compressed using a lossy compression scheme; a composition processing stage that is operable to output one or more regions of a composited output surface that have been compressed using a lossy compression scheme; and one or more compression processing stages that is or are operable to output one or more regions of one or more surfaces that have been compressed using a lossy compression scheme.

In an embodiment, only one of the one of the one or more processing stages is operable to output a surface that has been compressed using a lossy compression scheme. However, there may be (and in an embodiment there are) plural stages of the one or more processing stages that are capable of outputting (operable to output) one or more regions of a surface that have been compressed using a lossy compression scheme. Each processing stage that is capable of providing a compressed output in an embodiment includes a suitable compression "engine" (e.g. executes a compression routine) for that purpose.

The processing stage(s) that are able to provide a compressed output can be selected as desired.

It is generally preferable that a compressed output should be provided as early as possible in the overall processing flow that generates and provides the output surface that is displayed, as this will mean that the bandwidth and power are reduced as much as possible.

Thus, in an embodiment at least one or more of the frame generator processing stage(s) are capable of outputting one or more regions of one or more surfaces that have been compressed using a lossy compression scheme.

In embodiments that use composition, in an embodiment at least the composition stage is capable of outputting one or more regions of a composited output surface that have been compressed using a lossy compression scheme. The composition stage in an embodiment comprises a compression engine operable to compress the composited surface using the lossy compression scheme for this purpose.

Where one or more of the compressed regions or surfaces output by a processing stage will be further modified and/or processed (e.g. by one or more other processing stages), i.e. before being provided to the display controller and/or being used as or to form the output surface for display, then the one or more compressed regions or surfaces may have to be (and in embodiments are) decompressed before being modified and/or processed appropriately (and in an embodiment then re-compressed) (e.g. by the one or more processing stages that perform the modification and/or processing).

For example, in embodiments that use composition, and where one or more of the regions or surfaces to be composited have been compressed using a lossy compression scheme, one or more of, and in an embodiment all of, the compressed regions or surfaces to be composited are in an embodiment decompressed prior to compositing, e.g. if desired or necessary for the proper operation of the composition stage.

Thus, in an embodiment, one or more of the processing stages (and in an embodiment at least the composition stage) is capable of and operable to decompress compressed regions of a surface, e.g. to generate one or more decompressed regions of the surface (e.g. for modification and/or composition). The one or more of the one or more processing stages (e.g. composition stage) in an embodiment comprises a decompression engine operable to decompress one or more regions of a surface for this purpose.

It should be noted here that in embodiments where one or more compressed region(s) are decompressed, the bandwidth requirements of the system are still advantageously reduced, i.e. at least for the particular instance in which data is transferred between the processing stages in the compressed form.

In some embodiments, it may be preferable to avoid the processing required to compress, decompress (and then recompress) region(s) or surface(s) that are to be modified and/or processed and/or composited, e.g. where the benefits from the reduction in bandwidth are outweighed by the necessity to perform the additional compression/decompression processing. In such cases, the additional processing can be avoided, e.g. by not initially compressing the region(s) or surface(s), e.g. if it is known that the region(s) or surface(s) are to be modified and/or processed and/or composited.

Thus, in an embodiment, where a region or surface provided by a processing stage will be further modified and/or processed and/or composited, i.e. before being provided to the display controller and/or being used as or to form the output surface for display, then that processing stage is in an embodiment controlled to output the region or surface in an uncompressed form. Correspondingly, where a region or surface provided by a processing stage will be other than (not) further modified and/or processed and/or composited, i.e. before being provided to the display controller and/or being used as or to form the output surface for display, then that processing stage is in an embodiment controlled to output the one or more regions or surfaces in a compressed form using a lossy compression scheme.

One or more of the processing stage(s) that can provide a compressed output can be configured to always provide a compressed output (and correspondingly one or more of the processing stage(s) that provide an uncompressed output can be configured to always provide an uncompressed output), but more in an embodiment one or more of the processing stage(s) is capable of providing both a compressed output and an uncompressed output, in an embodiment selectively, as desired. Such a processing stage is in an embodiment operable to selectively enable/disable its compression operation to do this.

In an embodiment, a processing stage that is operable to provide both a compressed output and an uncompressed output is operable to selectively provide a compressed output or an uncompressed output selectively on a region-by-region or surface-by-surface basis.

Thus, in one embodiment, for each region or surface to be output from a (particular) processing stage, it is determined whether the region or surface will be modified and/or processed and/or composited, i.e. before being provided to the display controller and/or being used as or to form the output surface for display.

In an embodiment, when (if) it is determined that the region or surface will be modified and/or processed and/or composited, then the processing stage is in an embodiment operated to output the region or surface in an uncompressed form. In an embodiment, when (if) it is determined that the region or surface will not be modified and/or processed and/or composited, then the processing stage is in an embodiment operated to output the region or surface in a compressed form.

This can help to ensure that the overall power consumption of the system due to bandwidth and processing requirements are reduced.

In another embodiment, where any required modification(s) to a region or surface consist of (e.g. relatively simple) image processing modifications, e.g. that can be predicted before passing the region or surface through the entire sequence of stages (e.g. that would normally be performed by the display controller) (such as, for example, image enhancement modifications, such as altering the contrast and/or brightness, performing gamma correction, and/or performing tone mapping; rotation and/or scaling; and/or image enhancement schemes, e.g. to improve display responsiveness, such as Level Adaptive Overdrive (LAO), Feed Forward Drive (FFD), Dynamic Contrast Compensation (DCC), etc.), then the processing stage that provides the region or surface may be operated to perform the image processing modifications itself.

Any one or more of the one or more upstream processing stages may be configured to (selectively) perform image processing modifications to one or more regions or surfaces in this way. Thus, for example, in an embodiment at least one or more of the frame generator processing stage(s) are capable of performing image processing modifications. In embodiments that use composition, in an embodiment at least the composition stage is capable of performing image processing modifications.

One or more of the processing stage(s) that can perform image processing modifications can be configured to always perform such image processing modifications, but in an embodiment one or more of the processing stage(s) is capable of selectively performing image processing modifications, as desired. In an embodiment, this may be done on a region-by-region or surface-by-surface basis.

In one embodiment, for each region or surface to be output from a (particular) processing stage, it is determined whether the region or surface will be (or is likely to be) modified and/or processed and/or composited, i.e. before being provided to the display controller and/or being used as or to form the output surface for display.

In an embodiment, when (if) it is determined that the region or surface will be other than (not) be further modified and/or processed and/or composited, then the processing stage is in an embodiment operated to perform the desired image processing modification(s) itself. In an embodiment, when (if) it is determined that the region or surface will be further modified and/or processed and/or composited, then the processing stage is in an embodiment operated to other than (not) perform the desired image processing modification(s) itself.

This will then mean that the modified (and compressed) regions or surfaces will not need to be decompressed by the display controller in order to perform the image processing modifications, so that the display controller decompression, modification, and/or compression stage(s) may be bypassed, and the processing required to compress, decompress (and then recompress) region(s) or surface(s) can be avoided.

Each (upstream) processing stage that is able to provide a lossily compressed output surface could use the same or a different lossy compression scheme to the other processing stages that can provide a lossily compressed output surface. However, in an embodiment, each (upstream) processing stage that is able to provide a lossily compressed output surface uses the same lossy compression scheme to the other processing stages that can provide a lossily compressed output surface.

The lossy compression scheme or schemes that the upstream processing stages use may comprise any suitable and desired lossy compression scheme.

In an embodiment, the or each lossy compression scheme used by the (upstream) processing stages is a scheme that is (selected) based on the lossy compression scheme to be used by the display controller (that will be used to compress the output surface that is sent to the display). The "processing stage" compression scheme is in an embodiment related to, and/or matched in some way (e.g., and in an embodiment, in terms of one or more of its characteristics), to the display controller lossy compression scheme.

Thus, for example, in an embodiment, the processing stage lossy compression scheme uses the same compression format and/or algorithm as the display controller lossy compression scheme, e.g. is a linear compression scheme where the display controller compression scheme is a linear compression scheme (as against, e.g., being a block-based compression scheme). In an embodiment the processing stage lossy compression scheme is a linear compression scheme.

As will be appreciated by those skilled in the art, lossy compression schemes effectively discard some of the image quality in order to compress an image. Lossy compression schemes are typically able to compress data to a greater degree than lossless compression schemes, but at the expense of introducing noise or artefacts into the image data. Accordingly, a given lossy compression scheme will have its own visual effects on an image, e.g. its own particular noise characteristics or artefacts.

By matching the lossy compression schemes that are used, the overall memory bandwidth and power requirements of the system can be reduced, but without adversely affecting the quality of the image that is displayed.

In an embodiment of the technology described herein, the noise characteristics of the processing stage lossy compression scheme(s) are selected based on (matched to) the noise characteristics of the display controller compression scheme, in an embodiment such that surfaces compressed using the two lossy compression schemes will display the same or similar noise artefacts.

In one embodiment, the lossy compression schemes are matched by the processing stage(s) using the same lossy compression scheme as the display controller.

Thus, the lossy compression scheme used by the processing stage(s) may comprise a substantially visually lossless compression scheme, and may use Delta Pulse Code Modulation (DPCM) and/or Indexed Colour History (ICH). The lossy compression scheme may operate on raster lines of the image to be compressed, i.e. where each raster line (row) of pixels (sampling positions) is in an embodiment compressed together. In an embodiment, the processing stages use Display Stream Compression (DSC).

In another embodiment, the processing stage(s) use a different lossy compression scheme to the display controller, but the lossy compression schemes are matched by the processing stage compression scheme(s) being based on the display controller compression scheme, and in an embodiment by the processing stage compression schemes being configured based on the characteristics of the display controller compression scheme (and in an embodiment so as to try to match the noise characteristics of the display controller compression scheme).

In these embodiments, the processing stage lossy compression scheme is in an embodiment based as closely as possible on the display controller compression scheme (e.g. DSC), i.e. to thereby ensure that the noise characteristics are as similar as possible. Thus, for example, the processing stage lossy compression scheme in an embodiment uses the same type of compression where possible (e.g. Delta Pulse Code Modulation (DPCM) and/or Indexed Colour History (ICH)).

In an embodiment, the processing stage(s) that provide a compressed output are arranged to provide compressed output regions or surfaces in a form that is (directly) compatible with the display controller lossy compression scheme. For example, where the display controller lossy compression scheme is configured to operate on raster lines of an output surface (e.g. frame for display), the processing stage(s) that provide a compressed output can be arranged to provide compressed output regions in the form of raster lines, i.e. rows of sampling positions (e.g. pixels).

Thus, in an embodiment, the processing stage(s) that provide a compressed output is or are arranged to provide output regions having a size (e.g., and in an embodiment in terms of the number of sampling positions and shape (e.g. and in an embodiment, in terms of the layout of the sampling positions in the output surface, such as a raster line) corresponding to the size and shape of the regions that the display controller compression scheme is configured to operate on (i.e. the compressed regions output by the at least one of the one or more processing stages have a size and shape corresponding to the size and shape of the compressed regions of the output surface that the display controller provides to the display).

In other words, in this embodiment the compression "window" that the processing stage lossy compression scheme operates on will be the same as the compression window that the display controller lossy compression scheme operates on.

This facilitates the compressed output regions output by the processing stage(s) being compatible with the display controller compression scheme, and therefore (potentially) being able to be provided directly to the display (e.g. where the other relevant characteristics of the lossy compression schemes sufficiently match), bypassing the display controller decompression/compression stages when appropriate (as discussed above).

However, it may be the case (and in embodiments it is the case) that the shape of the regions output (and operated on) by one or more of the processing stages (the compression window) is different to the shape of regions (the windows) that the display controller compression scheme is configured to operate on (to compress) (i.e. the compressed regions output by the at least one of the one or more processing stages may have a shape different to the shape of the compressed regions of the output surface that the display controller is to provide to the display).

For example, one or more of the processing stages may be configured to output (and operate on, e.g. compress) regions in the form of two-dimensional blocks (arrays) of sampling positions (i.e. "tiles") of an output surface (i.e. regions whose height and width are each greater than a single sampling position), whereas the display controller compression scheme may be configured to operate on (to compress) raster lines of the output surface, i.e. rows of sampling positions that are one sampling position high and many pixels sampling positions wide (long).

In one embodiment, in order to address this, the processing stage lossy compression scheme is configured to compress sampling positions from multiple output regions (e.g. tiles) together, e.g. and in an embodiment, to form a compressed line (row) of sampling positions that is formed by concatenating respective rows of sampling positions from different output regions (e.g. tiles).

Thus, for example, where one or more of the processing stages are configured to output (and operate on) regions in the form of two-dimensional blocks (arrays) of sampling positions (i.e. "tiles") and the display controller compression scheme is configured to operate on (to compress) raster lines, i.e. rows of sampling positions together, the rows of sampling positions that are compressed together using the lossy compression scheme by the processing stage in question can be (and in an embodiment are) taken from plural blocks (tiles) of the surface that is output by the processing stage in question.

In an embodiment, the sampling positions from each corresponding row of each of plural output surface regions (tiles) are compressed together. For example, the sampling positions in the top rows of each of the tiles in a row of tiles can be compressed together. The sampling positions in the second rows of each of the tiles in the row of tiles can be compressed together, and so on.

Thus, in these embodiments, the sampling positions for each region that the lossy compression scheme is configured to compress together can be (and in an embodiment are) taken from plural of the regions (blocks) output by the processing stage in question. Equally, the sampling positions for each region that the processing stage lossy compression scheme is configured to compress together need not (and in an embodiment do not) comprise all of the sampling positions from a given output region.

Thus, in an embodiment, the processing stage compression scheme is arranged to produce lossily compressed regions that have a shape (that use a compression window) that corresponds to the shape of the regions that the display controller compression scheme is configured to operate on (to compress) (but the shape of the regions initially output by the processing stage(s) (e.g. one or more of the frame generators) need not have (and in an embodiment does not have) the same corresponding shape). This again facilitates the compressed output regions from the processing stage being (potentially) compatible with the display controller compression scheme, such that they can then (potentially) bypass the display controller decompression/compression stages when appropriate (as discussed above).

In these embodiments, as well as the compressed output regions that are produced by the processing stage having a shape that corresponds to the shape of the regions that the display controller compression scheme is configured to operate on and to produce (e.g. raster lines of the output surface), the size of the regions that the processing stage compression scheme produces as compressed output regions is in an embodiment set to be the same as (e.g. and in an embodiment, in terms of the number of sampling positions that are compressed for any given particular region) the size of the regions that the display controller compression scheme operates on. This again facilitates the compressed output regions from the processing stage being (potentially) compatible with the display controller compression scheme.

However, other arrangements, such as the compressed output regions that the processing stage compression scheme produces having a different size (e.g. number of sampling positions) to the regions that the display controller compression scheme is configured to operate on would also or instead be possible, if desired.

As will be appreciated, it can be the case (and in embodiments it is the case) that the output regions (e.g. tiles) that make up a surface are not generated at the same time. This may be the case, for example, in tile-based systems.

Where sampling positions from multiple output surface regions are compressed together, the lossy compression may be performed once all of the relevant regions (e.g. tiles) have been generated. Alternatively, the lossy compression may be (and in an embodiment is) performed "on-the-fly", i.e. while the regions (tiles) are being generated. That is, as each output region (tile) is generated, the relevant sampling positions (e.g. sampling position row) of that tile are in an embodiment compressed together with any already compressed sampling positions (e.g. the corresponding sampling position rows) from earlier generated output regions (tiles). In this latter embodiment, any state information that is necessary for the compression operation is in an embodiment saved and carried forward, e.g. from tile to tile, to allow later regions (tiles) to be appropriately compressed together with the already compressed sampling positions.

In another embodiment, the processing stage lossy compression scheme(s) does not (necessarily) compress regions having the shape of the regions that the display controller compression scheme is configured to operate on (to compress). For example, the processing stage lossy compression scheme could, and in an embodiment does, act to compress sampling positions for a given two-dimensional block of sampling positions (e.g. tile or tiles), rather than producing compressed regions that will correspond to, e.g., raster lines of an output surface that the display controller lossy compression scheme may operate on and produce.

In this case, the processing stage lossy compression scheme could be configured for the regions that are to be compressed, e.g. be a block-based scheme, but in an embodiment, the processing stage lossy compression scheme is a linear compression scheme, but rather than compressing rows of the output surface, it linearly compresses the sampling position data for two-dimensional blocks of the output surface in turn.

By using a linear compression scheme, some compatibility with the display controller compression scheme (if that is a linear scheme) can be maintained, but by applying the linear scheme to respective blocks of the output surface produced by the processing stage rather than, e.g. raster lines, compatibility with the format of the output surface for the processing stage operations can be maintained as well.

This may accordingly be particularly useful where the size and/or shape of the regions that it is desired to output (and operate on) by one or more of the processing stages is not the same as the size and/or shape of regions that the display controller compression scheme is configured to operate on (to compress).

Thus, in an embodiment, the processing stage lossy compression scheme uses a linear lossy compression scheme, and in an embodiment display stream compression (DSC), but operates to linearly compress sampling position values (data values) for two-dimensional arrays (blocks) of sampling positions (e.g., and in an embodiment, tiles) of the output surface in question, rather than for linear regions of sampling positions in the output surface.

This may be done in any manner as desired. For example, in one embodiment, where each output region comprises a two-dimensional block (array) of sampling positions (i.e. a tile), the plural rows of sampling positions of each output region are in an embodiment compressed together in sequence, e.g. row-by-row (i.e. the first row, followed by the second row, followed by the third row etc.).

Thus, in an embodiment, each region of the output surface that the display controller provides to the display comprises a single row of sampling positions of the output surface; and each lossily compressed region output by the at least one of the one or more processing stages comprises plural rows of sampling positions, wherein the plural rows of sampling positions of each compressed region are linearly compressed together in sequence.

The sampling positions could, of course, be compressed together using any suitable and desired order or sequence. For example, in various embodiments, the sampling regions may be compressed together along a Hilbert curve, or using z-order (Morton Order), etc.

As will be appreciated, regions compressed in this manner may not be directly compatible with the display controller compression scheme, and so may not be able to bypass the display controller decompression/compression stages (as discussed above).

Nevertheless, compressing the processing stage output regions in this manner is particularly useful and convenient since the integrity of each region (tile) can be maintained throughout the processing operations, which can be advantageous, e.g. in tile-based data processing systems, but the noise characteristics (visual artefacts) produced for a compressed region will tend to be similar to the noise characteristics (visual artefacts) produced by the display controller lossy compression scheme (e.g. DSC), i.e. such that the quality of the image that is displayed should not be adversely affected.

In these arrangements, the processing stage compression scheme could compress the sampling position blocks (tiles) that the processing stage in question produces separately (and in one embodiment, this is what is done). This will help to maintain compatibility with the operation of the processing stage or stages in question.

Correspondingly, each set of sampling positions that is compressed could be from a single output region of the processing stage (e.g. tile output by the processing stage) (and may, e.g., be all or part of the region of the processing stage, e.g. depending upon the window (filter) size of the linear compression scheme), or may be formed from two or more regions (e.g. tiles) output by the processing stage (e.g. in the case where the compression scheme window is larger than a single output region (tile)).

In these arrangements the sampling position blocks (regions) that are linearly compressed may be different in size to (e.g., and in an embodiment, in terms of the number of sampling positions that are compressed as a "block") the size of the compressed output surface regions that the display controller compression scheme produces (operates on), but in an embodiment, the size of the regions (blocks) that are compressed are arranged to be the same as the size of the regions that the display controller compression scheme produces (compresses). This will help to facilitate compatibility with the display controller compression scheme.

It is believed that the above arrangements for compressing a block-based output using a linear compression scheme so as to, e.g., facilitate compatibility with a later linear compression scheme in a data processing system, may be new and advantageous in its own right.

Thus, a further embodiment of the technology described herein comprises a method of linearly compressing an output data array that is produced as a plurality of two-dimensional blocks of data values that together make up the output data array, the method comprising:

forming a row of data values of the output array to be compressed using a linear compression scheme by concatenating data values from a plurality of data position rows from one or more of the two-dimensional data value blocks making up the output data array; and linearly compressing the so-formed row of data values to provide a linearly compressed output block of data values for the output data array.

A further embodiment of the technology described herein comprises a processing stage of a data processing system, the processing stage comprising processing circuitry configured to:

produce an output data array as a plurality of two-dimensional blocks of data values that together make up the output data array;

and to:

form a row of data values of the output array to be compressed using a linear compression scheme by concatenating data values from a plurality of data position rows from one or more of the two-dimensional data value blocks making up the output data array; and linearly compress the so-formed row of data values to provide a linearly compressed output block of data values for the output data array.

As will be appreciated by those skilled in the art, these embodiments of the technology described herein can, and in an embodiment do, include one or more or all of the optional features of the technology described herein described herein, as appropriate.

Thus, for example, the output data array is in an embodiment an output surface to be used as or to form an output surface for display, and the two-dimensional blocks of data values are in an embodiment respective processing tiles that a processing stage that is producing the output surface operates on and produces as its output.

Correspondingly, the process is in an embodiment repeated for all the blocks that make up the output data array to provide a linearly compressed version of the output data array.

The order that the data values from the plurality of data position rows are concatenated in can be selected as desired. In an embodiment, the data values from the plurality of data position rows are concatenated using one of: Hilbert order; Z-order; and on a data value block row by data value block row basis.

In one embodiment, the row of data values to be compressed using a linear compression scheme is formed by concatenating (at least) data values from a plurality of data position rows from one data value block making up the output array of data values (e.g. by concatenating the first row of the block with the second row of the block and then the third row of the block, and so on, as appropriate).

Correspondingly, in another embodiment the row of data values to be compressed using the linear compression scheme is formed by concatenating data values from data position rows from plural different data value blocks making up the output data array, and in an embodiment by concatenating the respective corresponding data position rows (e.g. the nth row) from each of plural data value blocks of a row of data value blocks making up the output array (e.g., and in an embodiment, by concatenating the first data position row from each of the data value blocks in the row of data value blocks to form one row of data values to be linearly compressed, concatenating the second rows data values from each of the data value blocks in the row of data value blocks to form a second row of data values to be linearly compressed, and so on).

It would also be possible to use other forms of lossy compression scheme that are based on and/or configured to match (e.g. in terms of their characteristics) the display controller lossy compression scheme.

In this case (and otherwise), the processing stage compression scheme could be "tuned" to the display controller lossy compression scheme in any suitable and desired manner. For example, one or more of the least significant bits of the output of a given compression scheme could be discarded to make the scheme lossy and to tune it to the display controller compression scheme. Alternatively or additionally, the compression ratio (the rate controller) of the processing stage lossy compression scheme could be controlled based on the display controller compression scheme.

For example, in one embodiment, the lossy compression scheme may comprises a version of ARM Frame Buffer Compression (AFBC) that is made to be lossy, e.g. by discarding one or more of the least significant bits.

In an embodiment, the display controller is operable to send (feed-back) information (e.g. and in an embodiment relating to its lossily compressed output that it is providing to the display) to one or more of the processing stage(s) that provide a compressed output. The information is then in an embodiment used to control (e.g. tune) the lossy compression scheme of the processing stage(s) in question. Thus, the processing stage lossy compression scheme is in an embodiment controlled based on information (feedback) relating to the display controller lossy compression scheme (that is currently in use).

In one embodiment, the feedback information comprises information regarding the characteristics, and in an embodiment the lossiness, of the display controller compression, and is in an embodiment used to control the compression ratio (the rate controller) of the processing stage lossy compression scheme. For example, in an embodiment, the display controller compression ratio for a particular (e.g. current and/or previous) surface or surfaces (frame or frames) can be used to control the compression ratio of the processing stage lossy compression scheme, e.g. for the next surface or set of surfaces (frame or frames). This can ensure that the processing stage lossy compression scheme is properly "matched" to the display controller compression scheme.

The processing stages and display controller, etc., could process (e.g. generate and/or otherwise process) their respective surfaces as a whole (e.g. as whole frames). In this case the output surface region would comprise the whole frame. However, in an embodiment at least one of, and in an embodiment all of, the processing stages and/or display controller process their respective surfaces as respective sub-regions (sub-areas) of the overall surface (e.g. frame) in question.

In this case, the regions of the surfaces that are considered and used will each comprise a portion (some but not all) of the (area of the) surface in question (i.e. the surface or surfaces are divided into a plurality of regions). The regions of the surfaces can each represent any suitable and desired region (area) of the surface in question. So long as the surface in question is able to be divided or partitioned into a plurality of identifiable smaller regions each representing a part of the overall surface that can be identified and processed in the manner of the technology described herein, then the sub-division of the surfaces into regions can be done as desired.

In embodiments, the regions correspond to respective blocks of data corresponding to respective parts of the overall array of data that represents the surface in question (as is known in the art, the surfaces will typically be represented as, and stored as, arrays of sampling position (e.g. pixel) data).

All the surfaces can be divided into the same size and shape regions (and in one embodiment this is done), or, alternatively, different surfaces could be divided into different sized shapes and regions.

Each surface region (e.g. block of data) in an embodiment may represent a different part (region) of the surface (overall data array) (although the regions could overlap if desired). Each region (data block) should ideally represent an appropriate portion (area) of the surface (data array), such as a plurality of data positions (sampling positions) within the surface. Suitable region sizes could be, e.g., 8×8, 16×16 or 32×32 data positions in the surface data array.

In some embodiments, the surfaces are divided into regularly sized and shaped regions (e.g. blocks of data), in an embodiment in the form of squares or rectangles. However, this is not essential and other arrangements could be used if desired.

In some embodiments, each surface region corresponds to a processing tile that a graphics processor or video engine or composition stage or camera ISP, etc., that is rendering or generating or otherwise providing the surface produces as its output. This is a particularly straightforward way of implementing the technology described herein, as the graphics processor, display engine or controller will generate the tiles directly, and so there will be no need for any further processing to "produce" the surface regions that will be considered in the manner of the technology described herein.

(As is known in the art, in tile-based rendering for example, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (regions) are each rendered separately (typically one after another). The rendered tiles (regions) then form the complete output array (frame) (render target), e.g. for display.

Other terms that are commonly used for "tiling" and "tile based" rendering include "chunking" (the regions are referred to as "chunks") and "bucket" rendering. The terms "tile" and "tiling" will be used herein for convenience, but it should be understood that these terms are intended to encompass all alternative and equivalent terms and techniques.)

In these arrangements of the technology described herein, the tiles that the surfaces are divided into for rendering and/or composition, etc., purposes can be any desired and suitable size or shape. The tiles in some embodiments are all the same size and shape, as is known in the art, although this is not essential. In some embodiments, each tile is rectangular (including square), and in an embodiment 8×8, 16×16, 32×32, 32×4 or 32×1 sampling positions in size. Non-square rectangular regions, such as 32×4 or 32×1 may be better suited for output to a display.

In some embodiments, the technology described herein may be, and in an embodiment is, also or instead performed using surface regions of a different size and/or shape to the tiles that the rendering, etc., process operates on (produces). For example, in some embodiments, the surface regions that are considered in the manner of the technology described herein may be made up of a set of plural "processing" tiles, and/or may comprise only a sub-portion of a processing tile. In these cases there may be an intermediate stage that, in effect, "generates" the desired surface regions from the "processing" tile or tiles in question.

In these arrangements where a surface is treated as being made up of plural regions, the technique of the technology described herein should be, and is in an embodiment is used for plural, and in an embodiment for each, respective region of the surface. Thus, in an embodiment, plural regions of, and in an embodiment each region of, a surface are processed in the manner of the technology described herein. In this way, the whole output surface (e.g.) will be generated by the process of the technology described herein.

Although the technology described herein is described above with particular reference to the processing of a given output surface for display, as will be appreciated by those skilled in the art, the technology described herein can be, and is in an embodiment, used for providing plural output surfaces for display, and in an embodiment for providing a sequence of output surfaces (e.g. frames) to be displayed to a display.

The various stages of the data processing system may be implemented as desired, e.g. in the form of one or more fixed-function units (hardware) (i.e. that is dedicated to one or more functions that cannot be changed), or as one or more programmable processing stages, e.g. programmable circuitry that can be programmed to perform the desired operation. There may be both fixed function and programmable stages.

One or more of the various processing stages of the technology described herein may be provided as separate circuit elements to one another. Additionally or alternatively, some or all of the stages may be at least partially formed of shared circuitry.

One or more of the various stages of the technology described herein may be operable to always carry out its function on any and all received surfaces. Additionally or alternatively, one of more of the stages may be operable to selectively carry out its function on the received surfaces, i.e. when desired and/or appropriate.

The data processing system may and in an embodiment does also comprise one or more of, and in an embodiment all of: a central processing unit, a graphics processing unit, a video processor (codec), a system bus, a memory controller, and additional elements as known to those skilled in the art.

The data processing system may be, and in an embodiment is, configured to communicate with one or more of (and the technology described herein also extends to an arrangement comprising one or more of): an external memory (e.g. via the memory controller), one or more local displays, and/or one or more external displays.

In an embodiment, the data processing system further comprises a or the display. The display that the display controller is used with may be any suitable and desired display, such as for example, a screen or a printer.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

FIG. 1 shows schematically a data processing system 1. The data processing system 1 comprises a camera image signal processor (ISP) 2, a central processing unit (CPU) 3, a graphics processing unit (GPU) 4, a video engine or codec 5, an image processor 6 (which may comprise, e.g., a composition engine), a display controller 7, and a memory controller 8. As shown in FIG. 1, these communicate via an interconnect 9 and have access to off-chip main memory 10. The camera ISP 2 communicates with an image sensor 11 of a camera so as to receive image data from the camera. The display controller 7 communicates with a display 12 via a display interface so as to cause output frames (surfaces) to be displayed on the display 12.

Figure 2:
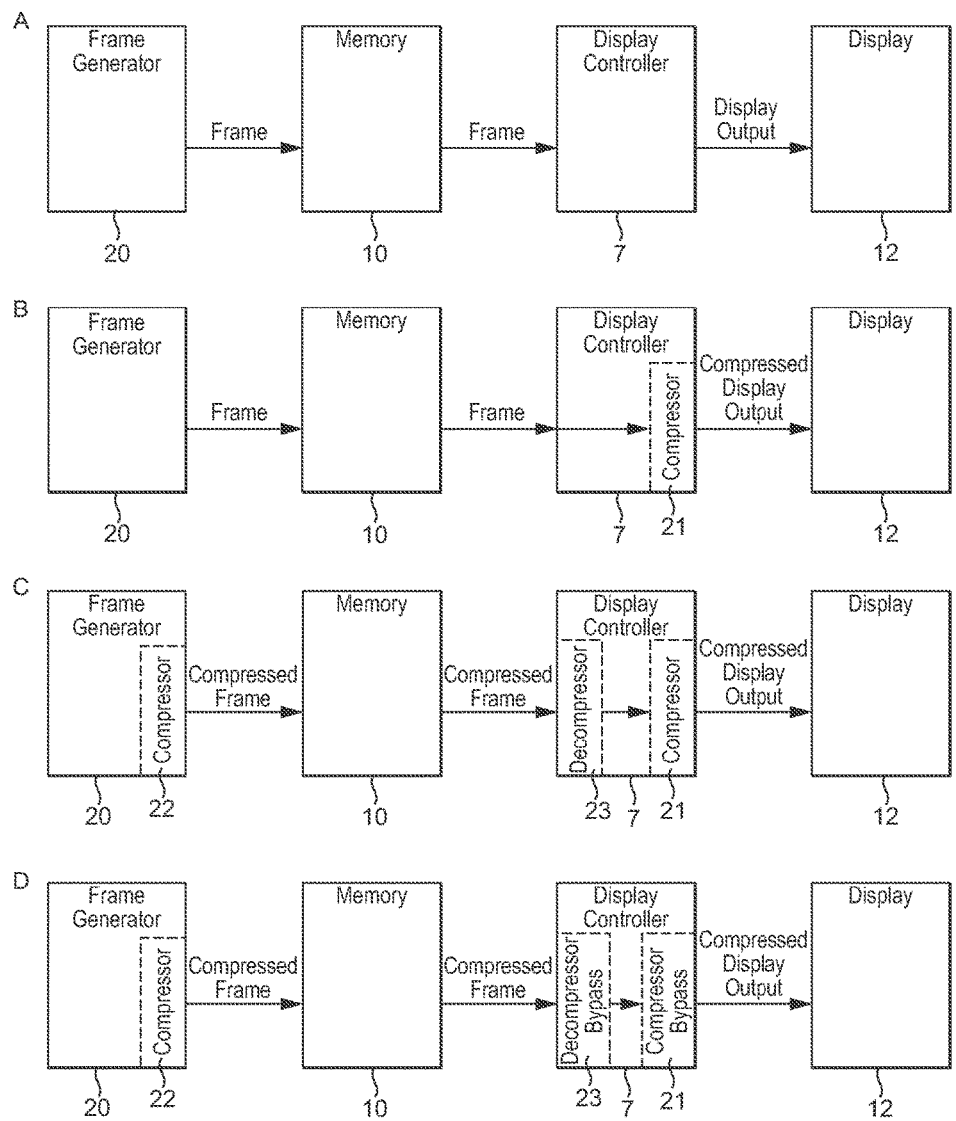
FIG. 2 shows schematically various data processing system processes.

FIG. 2A illustrates a method of operating the data processing system 1 that does not use compression. A frame generator 20 (which could comprise, e.g. the camera ISP 2, CPU 3, GPU 4, video engine 5, or image processor 6) generates a frame (surface) and stores it in main memory 10, e.g. in a frame buffer. The stored frame is read from the memory 10 by the display controller 7, which sends the frame to the display 12 for display.

Writing to and reading from the frame buffer, and sending the pixel data to the display require a significant amount of bandwidth. For example, a single high-definition (HD) frame read consumes about (1920×1080×24 bpp×60 Hz) 356 MB/s. A single ultra-high-definition (4K) frame fetch consumes about (3840×2160×24 bpp×60 Hz) 1.4 GB/s. These bandwidth numbers are multiplied in practice since the data needs to be both read from memory (e.g. by the display controller 7, and/or image processor or composition engine 6, etc.) and written to memory (e.g. by the GPU 4 and/or video decoder 5), there may be multiple processing stages in the data processing system, and multiple frames may need to be processed to generate the final frame (e.g. when using composition).

FIG. 2B illustrates a method of operating the data processing system 1 in which the pixel data sent from the display controller 7 to the display 12 is compressed, e.g. using Display Stream Compression (DSC).

DSC is a lossy compression standard that is designed to be computationally cheap with low latency, and that provides a known fixed bit rate. The algorithm uses Delta Pulse Code Modulation (DPCM), Indexed Color History (ICH), and operates on raster lines. A rate controller is used to control the lossiness of the compression. DSC can compress data by around 66% on the display interface (thus, for example, 24 bpp becomes 8 bpp).

As in the arrangement of FIG. 2A, the frame generator 20 of FIG. 2B generates a frame (surface) and stores it in main memory 10, e.g. in a frame buffer, and then the stored frame is read from the memory 10 by the display controller 7. The display controller 7 then compresses the frame (surface) using compression stage 21, before sending it to the display 12 for display. By compressing the display controller output in this manner, the overall bandwidth and power requirements of the data processing system can be reduced.

FIG. 2C illustrates a method of operating the data processing system 1 in which frames (surfaces) generated by frame generator 20 are compressed. In this embodiment, the frame generator 20 generates a frame (surface) which is then compressed by a compression stage 22. The compressed frame (surface) is stored in main memory 10, e.g. in a frame buffer, and then read by the display controller 7. As shown in FIG. 2C, in this embodiment, the compressed frame may be decompressed in the display controller 7 using decompression stage 23. This may be appropriate where, for example, the compression scheme used to compress the frame is not the same as (or is not sufficiently similar to) the display controller compression scheme, and/or where the frame (surface) requires modification by the display controller 7.

The display controller 7 compresses the (optionally modified) decompressed frame using compression stage 21 (e.g. using Display Stream Compression (DSC)), before sending it to the display 12 for display.

By compressing both the generated frame and the display controller output in this manner, the overall bandwidth and power requirements of the data processing system can be further reduced.

The Applicants have recognised that where the display output is compressed using lossy compression (such as DSC), using the same lossy compression scheme, or another lossy compression scheme that has similar noise characteristics, to compress the data (e.g. the generated frame) further up the pipeline will not adversely affect the quality of the image that is displayed, because the image quality that is lost by the upstream compression would in any event be lost by the display output compression.

FIG. 2D illustrates another method of operating the data processing system 1 in which frames generated by the frame generator 20 may be compressed using the same or a similar compression scheme to the display controller compression scheme. The frame generator 20 generates a frame (surface) which is then compressed by compression stage 22, e.g. using Display Stream Compression (DSC). The compressed frame is stored in main memory 10, e.g. in a frame buffer. The stored compressed frame is then read from the memory 10 by the display controller 7. In this embodiment, since the compressed frame has already been compressed using the display controller compression scheme, it need not be decompressed by decompression stage 23, nor compressed using compression stage 21, and instead is arranged to bypass the decompression stage 23 and the compression stage 21. The compressed frame is then sent to the display 12 for display.

In this embodiment, the overall bandwidth and power requirements of the data processing system are reduced in a similar manner to the arrangement of FIG. 2C. In addition, the processing requirements of the data processing system can be further reduced since the decompression 23 and compression 21 stages in the display controller 7 can be bypassed when appropriate.

The data processing system 1 of the present embodiment can be operated to perform any one or all of the methods of FIGS. 2A-D, e.g. selectively depending on the output of the particular frame generator (e.g. camera ISP 2, CPU 3, GPU 4, video engine 5, or image processor 6) and/or where appropriate.

Although the above embodiments have been described in terms of the frame generator 20 generating a frame and the display controller 7 causing the frame to be displayed, in various embodiments the frame (surface) generated by the frame generator may be subjected to one or more additional steps of processing, e.g. before it or a frame (surface) generated using it is displayed.

Figure 3:
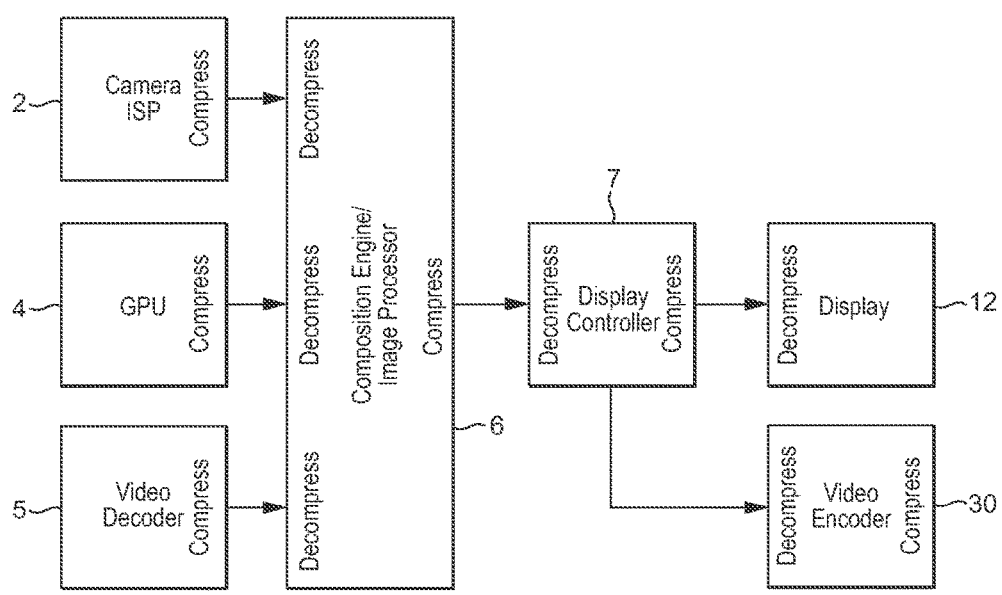
FIG. 3 shows schematically a data processing system process in accordance with an embodiment of the technology described herein.

FIG. 3 shows one such embodiment, in which a composition engine 6 generates a composited frame (surface). In the embodiment of FIG. 3, camera ISP 2, GPU 4 and video decoder 5 generate one or more surfaces (frames). As shown in FIG. 3, one or more of the one or more generated surfaces can be compressed, e.g. before they are stored in the main memory 10 (not shown).

The composition engine 6 then reads one or more of the generated surfaces, e.g. from memory 10. In the present embodiment, the composition engine 6 can decompress those surfaces that are compressed, before compositing the surfaces so as to generate a composited output frame (surface).

The composited output frame can then be compressed before being stored in main memory 10, and then read from the memory 10 by the display controller 7. The display controller 7 can decompress the read frame, e.g. where the compression scheme used to compress the frame is not the same as (or not sufficiently similar to) the display controller compression scheme, and/or where the frame requires further modification by the display controller 7. If the frame is decompressed, the display controller 7 can then compresses the frames e.g. using Display Stream Compression (DSC), before sending it to the display 12 for display.

Where the compression scheme used to compress the frame is the same as (or sufficiently similar to) the display controller compression scheme, and where the frame does not require further modification by the display controller 7, the display controller 7 can send the read compressed frame directly to the display for display, i.e. bypassing the decompression and compression stages.

The frame (surface) may be subjected to one or more other steps of processing, such as altering the contrast and/or brightness, performing gamma correction, and/or performing tone mapping; rotation and/or scaling; and/or image enhancement schemes to improve display responsiveness, such as Level Adaptive Overdrive (LAO), Feed Forward Drive (FFD), Dynamic Contrast Compensation (DCC), etc., as desired. Such processing may be performed by the display controller 7 or where appropriate by one or more of the stages, e.g. prior to compression.

Although the above embodiments have been described in terms of the display controller 7 sending the output frame to the display 12 for display, in further embodiments, additionally or alternatively, the display controller output may be sent to a video encoder. One such embodiment is shown in FIG. 3, in which display controller 7 can selectively send an output frame to a video encoder 30, e.g. for encoding and optional (e.g. wireless) transmission to another display. The video encoder can decompress the frame, encode the decompressed frame, and then compress the encoded frame, as desired.

Additionally or alternatively, the display controller 7 may write the compressed frame to memory 10.

Although the above embodiments have been described in terms of the data processing system operating on entire frames (surfaces), in other embodiments the data processing system of the technology described herein operates on portions of each frame, e.g. on blocks of data or tiles that make up each frame. Thus, in this embodiment, the frame generator 20 is operable to generate and write to memory 10 one or more portions of one or more frames, the display controller 7 is operable to read one or more such portions from memory 10, and the compression 21, 22 and decompression 23 stages are operable to compress or decompress one or more such portions.

In this embodiment, the data processing system can be operated to perform any one or all of the methods of FIGS. 2A-D, e.g. selectively depending on the particular frame (surface) portion in question.

Figure 4:
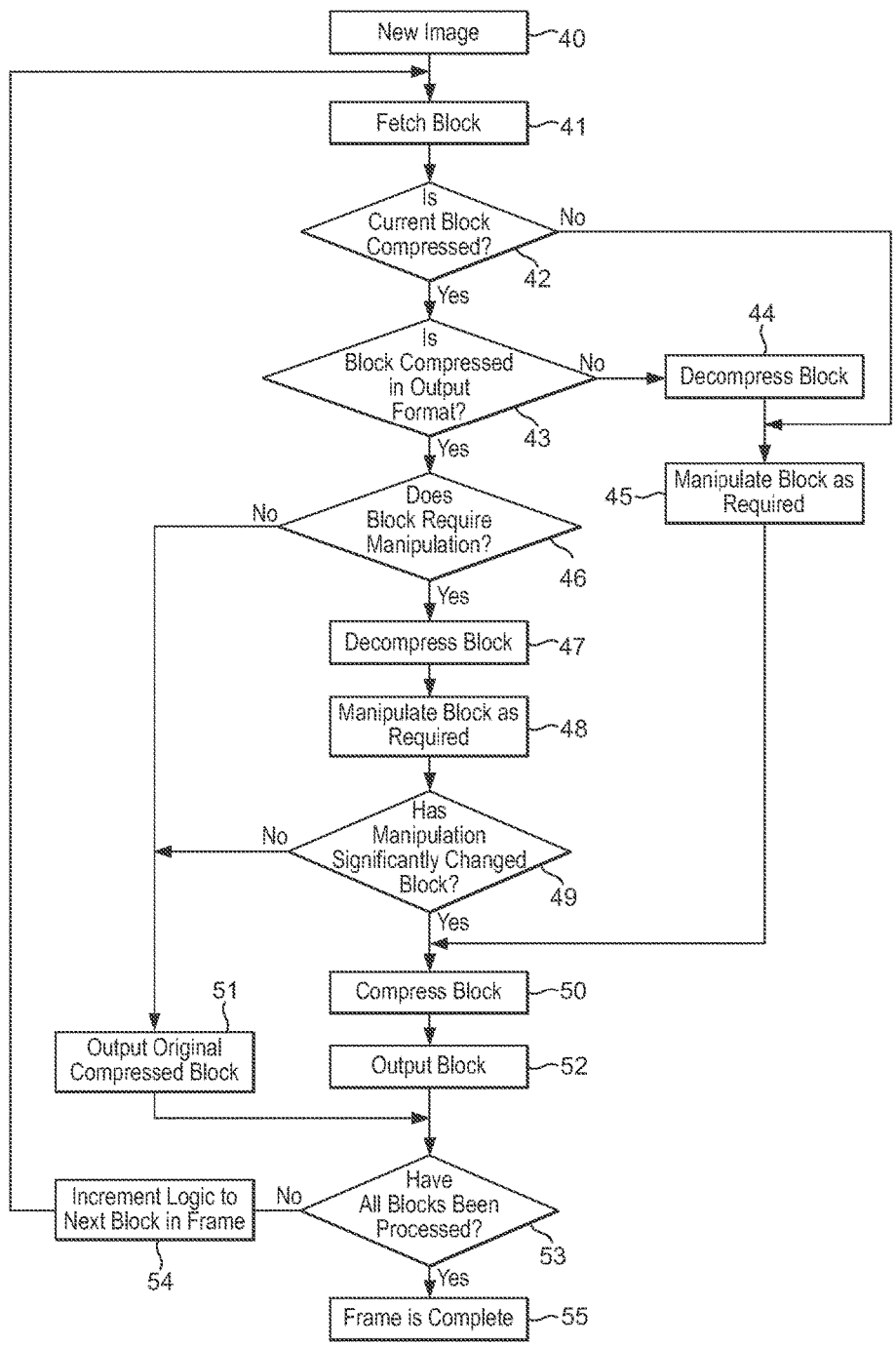
FIG. 4 shows a display controller process in accordance with an embodiment of the technology described herein.

FIG. 4 illustrates such a method of operating the display controller 7. For each new image (input surface (frame)) to be displayed (which could be generated, e.g., by the ISP 2, CPU 3, GPU 4, video engine 5 or image processor 6), the display controller 7 fetches (reads) a block of data corresponding to a portion (region) of the frame (surface) at step 41. In this example, each data block is assumed to be a processing tile of the surface (frame) in question, but other arrangements would, of course, be possible.

At step 42, it is determined whether the block is compressed. If the block is not compressed, then the display controller manipulates or modifies the block if required in step 45, and then compresses the block using DSC in step 50 and outputs it at step 52.

If the block is compressed, then it is determined whether the block is compressed using DSC at step 43. If the block is compressed using a compression scheme other than the DSC, then the block is decompressed at step 44, manipulated or modified if required at step 45, compressed using DSC in step 50, and output for display at step 52.

If the block is compressed using DSC, then it is determined whether the block requires manipulation or modification at step 46. If the block does not require manipulation or modification, then the display controller 7 provides the block to the display at step 51.

If the block requires manipulation or modification, then the display controller 7 decompresses the block at step 47, and manipulates or modifies the block as required in step 48.

It is then determined in step 49 whether the manipulated or modified block is the same as or sufficiently similar to the original block. This may be the case if the degree to which the modified block differs from original block is sufficiently small, e.g. falls below a threshold, i.e. such that any differences would be imperceptible when the block is displayed.

If the manipulated or modified block is the same as or sufficiently similar to the original block, then the display controller 7 provides the original compressed block to the display in step 51. The manipulated or modified block is discarded.

If the manipulated or modified is not the same as nor sufficiently similar to the original block, then the display controller compresses the modified block using DSC in step 50, and outputs the block for display in step 52.

Thus, where a block is modified, either the modified version of the block or the unmodified version of the block is output by the display controller 7, depending on whether the modification caused sufficient changes to the block. Where the unmodified version of the block is output by the display controller 7, the modified version of the block is discarded and is not compressed by the display controller 7, thereby reducing the amount of processing required by the display controller 7.

In an alternative embodiment, the check at step 49 is not made, and the manipulated or modified block is compressed, and output for display.

As shown in FIG. 4, this process is repeated for each block of the frame (surface) until the frame has been completely output for display (at step 55).

As discussed above, in the present embodiment either DSC, or another lossy compression scheme that has similar noise characteristics to DSC is used to compress the upstream data (e.g. the generated frame).

Where the upstream compression scheme is DSC, then the processing stage that generates the frame can be operated to output each frame as a plurality of raster lines (i.e. row) of pixels. Each such generated raster line can then be compressed using DSC as normal.

Alternatively, where the processing stage that generates the frame outputs each frame as a plurality tiles, then the pixels in the top rows of each of the tiles in each row of tiles can be compressed together, the pixels in the second rows of each of the tiles in the row of tiles can be compressed together, and so on. As will be appreciated, each of the tiles that make up a surface will typically be generated in sequence, i.e. not at the same time. Thus, in this embodiment, state information is carried between tiles to assist in the compression process while the tiles are being generated.

FIG. 5A illustrates such a linear compression scheme that operates to compress each raster line of each frame, i.e. pixels A1 to A15, and then pixels B1 to B15, etc.

This compression scheme ensures that the compressed regions will be directly compatible with the display controller's DSC compression scheme, and can therefore be arranged to bypass the display controller decompression/compression stages when appropriate (as discussed above).

In another embodiment, the lossy compression scheme is configured to compress each tile separately by compressing together each of the multiple rows of data positions of the tile in sequence, i.e. the first row, followed by the second row, followed by the third row etc.

This is illustrated in FIG. 5B. Each tile (which, in FIG. 5B, comprises a 3×3 group of pixels), is compressed together using the DSC algorithm. As shown in FIG. 5B, this is done by re-ordering the pixels A1 to A15 that are to be compressed together.

Although tiles compressed in this manner will not be able to bypass display controller decompression/compression stages, this scheme advantageously maintains compatibility with tile-based systems, while ensuring the noise characteristics introduced by the compression are very close to the noise characteristics introduced by regular linear DSC compression.

Other pixel ordering schemes may, of course, be used, such as e.g., following a Hilbert curve, or in z-order.

The raster line and tile based compression schemes can be implemented using similar hardware, so that the hardware can be re-used.

The compression algorithm used, the compression block shape (e.g. tile or line), and the compression ratio can be selected based on the display output compression. For example, if blocks are expected to be manipulated, a tile based compression scheme may be preferable over a line based scheme. Line based DSC compression can be used if the frame generator generates horizontal lines of tiles, i.e. so that the compression state can be carried across to the next tile that is processed.

The rate controller of the compression scheme can be tuned so that the compression scheme has similar characteristics as raster scan DSC and/or based on the size of the tiles to minimize visible compression artefacts.

In an alternative embodiment, a different compression scheme may be implemented which has similar compression artefacts as raster scan DSC. For example, the lossy compression scheme can comprise a modified version of ARM Frame Buffer Compression (AFBC) that is made to be lossy by discarding one or more of the least significant bits.

Other compression schemes may, of course, be used.

Figures 5, 6:
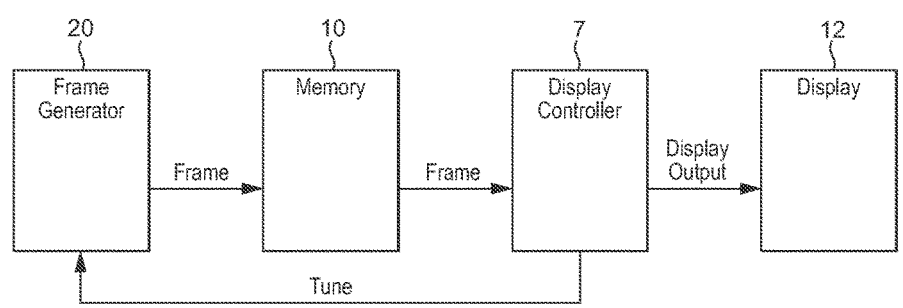
FIG. 5 shows schematically compression schemes in accordance with embodiments of the technology described herein.
FIG. 6 shows schematically a data processing system process in accordance with an embodiment of the technology described herein.

FIG. 6 illustrates an embodiment in which the upstream compression can be tuned. The frame generator 20 (e.g. ISP 2, GPU 4, video decoder 5, or image processor 6) generates a compressed frame. The frame is written to memory 10 and then sent to the display controller 7. In the present embodiment, the display controller 7 can perform some processing on the frame. For example, the frame may be decompressed and then compressed using a lossy compression scheme and then sent on to the display 12.

In the present embodiment, the display controller 7 provides compression tuning information back to the frame generator 20. This can be used to tune the upstream compression. For example, the lossiness of the raster scan compression can be fed back to the upstream lossy compression stage and used to control the compression ratio appropriately. The display controller compression ratio for the current and/or previous frame or frames can be used to control the compression ratio of the processing stage lossy compression scheme, e.g. for the next frame or set of frames.

In other words, the frame generator 20 can generate its data to an appropriate precision dependant on the tuning information provided to it by the display controller 7. For example, the frame generator 20 can generate lower quality frames if it knows that the display controller 7 lossy compression will discard more than a specified amount of data.

In these embodiments, there may be multiple processing stages. For example, the frame generator 20, may send the frame to memory 10, which is then read by a composition engine 6, which composits multiple frames to generate a composited frame. The composited output frame is written to memory 10, and then read by the display controller 7 and displayed.

In an embodiment, where a camera ISP has a direct interface to the display controller 7 the output from the camera ISP can be compressed using DSC compression. This reduces the amount of data that is passed from the ISP to the display controller, thereby reducing power consumption.

It can be seen from the above that the technology described herein provides an improved data processing system that requires a reduced amount of memory bandwidth and power, without adversely affecting the quality of an image that is displayed. This is achieved in embodiments at least, by lossily compressing at least one surface that is used to generate an output surface for display upstream of a display controller that provides an output surface to a display in a lossily compressed form.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A data processing system comprising:
a display controller operable to send a compressed version of an output surface to a display, wherein the output surface is to be displayed by the display, and wherein the compressed version of the output surface that is sent to the display has been compressed using a lossy compression scheme; and
one or more processing stages comprising processing circuitry configured to generate a surface or surfaces that are to be used when forming the output surface that is to be displayed by the display; wherein:
at least one of the one or more processing stages comprises processing circuitry configured to output, in a compressed form using a lossy compression scheme, one or more regions of the surface or surfaces that it generates to be used when forming the output surface that is to be displayed by the display;
wherein the display controller includes a compression stage and a decompression stage; and
wherein the data processing system is configured such that the one or more regions output by the at least one of the one or more processing stages in a compressed form using a lossy compression scheme can bypass the display controller decompression stage and compression stage.

2. The data processing system of claim 1, wherein the lossily compressed output surface that is sent to the display comprises one or more regions that have been compressed by the one or more processing stages without being compressed by the display controller.

3. The data processing system of claim 1, wherein the system comprises one or more or all of:
one or more frame generator processing stages comprising processing circuitry configured to output one or more regions of one or more surfaces that have been compressed using a lossy compression scheme;
a composition processing stage comprising processing circuitry configured to output one or more regions of a composited output surface that have been compressed using a lossy compression scheme; and
one or more compression processing stages comprising processing circuitry configured to output one or more regions of one or more surfaces that have been compressed using a lossy compression scheme.

4. The data processing system of claim 1, wherein the lossy compression scheme used by the at least one of the one or more processing stages is a scheme that is based on the display controller lossy compression scheme.

5. The data processing system of claim 1, wherein the noise characteristics of the lossy compression scheme used by the at least one of the one or more processing stages are matched to the noise characteristics of the display controller lossy compression scheme.

6. The data processing system of claim 1, wherein each of the compressed regions output by the at least one of the one or more processing stages comprises a row of data positions and each region of plural regions of the output surface that the display controller sends to the display comprises a row of data positions.

7. The data processing system of claim 1, wherein each of the compressed regions output by the at least one of the one or more processing stages comprises a block of data positions whose height and width are each greater than a single data position and each region of plural regions of the output surface that the display controller sends to the display comprises a row of data positions.

8. The data processing system of claim 1, wherein the at least one of the one or more processing stages comprises processing circuitry configured to:
produce an output data array as a plurality of two-dimensional blocks of data values that together make up the output data array, wherein each of the two-dimensional blocks of data values comprises a block of data positions whose height and width are each greater than a single data position;
and to:
form a row of data values of the output array to be compressed using the lossy compression scheme by concatenating data values from a plurality of data position rows from one or more of the two-dimensional data value blocks making up the output data array; and
linearly compress the so-formed row of data values using the lossy compression scheme to provide produce a compressed output region for the output data array.

9. The data processing system of claim 8, wherein the data values from the plurality of data position rows are concatenated using one of: Hilbert order; Z-order; and a data value block row by data value block row order.

10. The data processing system of claim 1, wherein the lossy compression scheme used by the at least one of the one or more processing stages is controlled based on the display controller lossy compression.

11. The data processing system of claim 1, wherein the display controller is configured to determine whether the one or more regions output by the at least one of the one or more processing stages is compressed using the display controller lossy compression scheme; and
wherein the display controller is configured such that when it is determined that the one or more regions output by the at least one of the one or more processing stages is compressed using the display controller lossy compression scheme, the one or more regions output by the at least one of the one or more processing stages bypasses the display controller decompression stage and the compression stage.

12. A method of operating a data processing system that comprises: a display controller operable to read a surface or surfaces from memory and to send a compressed version of an output surface to a display, wherein the output surface is to be displayed by the display, and wherein the compressed version of the output surface that is sent to the display has been compressed using a lossy compression scheme; and one or more processing stages operable to generate a surface or surfaces that are to be used when forming the output surface that is to be displayed by the display; the method comprising:
one or more of the one or more processing stages providing a surface or surfaces to be used when forming the output surface that is to be displayed by the display; and
the display controller reading at least one of the surfaces generated by a processing stage from memory, using the surface to form the output surface that is to be displayed by the display, and providing the output surface to the display in a compressed form that uses a lossy compression scheme;
wherein:
at least one of the one or more processing stages outputs, in a compressed form using a lossy compression scheme, one or more regions of the surface or surfaces that it generates to be used when forming the output surface that is to be displayed by the display;

wherein the display controller includes a compression stage and a decompression stage; and wherein the method comprises the one or more regions output by the at least one of the one or more processing stages in a compressed form using a lossy compression scheme bypassing the display controller decompression stage and compression stage.

13. The method of claim 12, wherein the lossily compressed output surface that is sent to the display comprises or more regions that have been compressed by the one or more processing stages without being compressed by the display controller.

14. The method of claim 12, wherein:
one or more frame generator processing stages outputs one or more regions of one or more surfaces that have been compressed using a lossy compression scheme; and/or
a composition processing stage outputs one or more regions of a composited output surface that have been compressed using a lossy compression scheme; and/or
one or more compression processing stages outputs one or more regions of one or more surfaces that have been compressed using a lossy compression scheme.

15. The method of claim 12, wherein the lossy compression scheme used by the at least one of the one or more processing stages is a scheme that is based on the display controller lossy compression scheme.

16. The method of claim 12, wherein the noise characteristics of the lossy compression scheme used by the at least one of the one or more processing stages are matched to the noise characteristics of the display controller lossy compression scheme.

17. The method of claim 12, wherein each of the compressed regions output by the at least one of the one or more processing stages comprises a row of data positions and each region of plural regions of the output surface that the display controller sends to the display comprises a row of data positions.

18. The method of claim 12, wherein each of the compressed regions output by the at least one of the one or more processing stages comprises a block of data positions whose height and width are each greater than a single data position and each region of plural regions of the output surface that the display controller sends to the display comprises a row of data positions.

19. The method of claim 12, further comprising the at least one of the one or more processing stages:
producing an output data array as a plurality of two-dimensional blocks of data values that together make up the output data array, wherein each of the two-dimensional blocks of data values comprises a block of data positions whose height and width are each greater than a single data position;
forming a row of data values of the output array to be compressed using the lossy compression scheme by concatenating data values from a plurality of data position rows from one or more of the two-dimensional data value blocks making up the output data array; and
linearly compressing the so-formed row of data values using the lossy compression scheme to produce a compressed output region for the output data array.

20. The method of claim 19, wherein the data values from the plurality of data position rows are concatenated using one of: Hilbert order; Z-order; and a data value block row by data value block row order.

21. The method of claim 12, further comprising:
controlling the lossy compression scheme used by the at least one of the one or more processing stages based on the display controller lossy compression by:
the display controller feeding back information relating to its lossily compressed output to the at least one of the one or more processing stages; and
the at least one of the one or more processing stages using the information to control its lossy compression scheme.

22. The method of claim 12, further comprising:
the display determining whether the one or more regions output by the at least one of the one or more processing stages is compressed using the display controller lossy compression scheme; and
when it is determined that the one or more regions output by the at least one of the one or more processing stages is compressed using the display controller lossy compression scheme, the one or more regions output by the at least one of the one or more processing stages bypassing the display controller decompression stage and the compression stage.

23. A non-transitory computer readable storage medium storing computer software code which when executing on a processor performs a method of operating a data processing system that comprises: a display controller operable to read a surface or surfaces from memory and to send a compressed version of an output surface to a display, wherein the output surface is to be displayed by the display, and wherein the compressed version of the output surface that is sent to the display has been compressed using a lossy compression scheme; and one or more processing stages operable to generate a surface or surfaces that are to be used when forming the output surface that is to be displayed by the display; the method comprising:
one or more of the one or more processing stages providing a surface or surfaces to be used when forming the output surface that is to be displayed by the display; and
the display controller reading at least one of the surfaces generated by a processing stage from memory, using the surface to form the output surface that is to be displayed by the display, and providing the output surface to the display in a compressed form that uses a lossy compression scheme;
wherein:
at least one of the one or more processing stages outputs, in a compressed form using a lossy compression scheme, one or more regions of the surface or surfaces that it generates to be used when forming the output surface that is to be displayed by the display;
wherein the display controller includes a compression stage and a decompression stage; and
wherein the method comprises the one or more regions output by the at least one of the one or more processing stages in a compressed form using a lossy compression scheme bypassing the display controller decompression stage and compression stage.

* * * * *